United States Patent
Mitchell et al.

(10) Patent No.: US 12,440,991 B2
(45) Date of Patent: Oct. 14, 2025

(54) ULTRA WIDEBAND LOCATION DETERMINATION WITH PREDICATIVE AND POWER SAVING CAPABILITIES

(71) Applicant: The Boeing Company, Chicago, IL (US)

(72) Inventors: Michael Francis Mitchell, Madison, AL (US); John Dalton Williams, Decatur, AL (US); Fei Cai, Edmonds, WA (US); Farahnaz Sisco, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 365 days.

(21) Appl. No.: 17/983,822

(22) Filed: Nov. 9, 2022

(65) Prior Publication Data
US 2024/0149454 A1    May 9, 2024

(51) Int. Cl.
*B25J 9/16*    (2006.01)
*G01S 5/14*    (2006.01)

(52) U.S. Cl.
CPC .............. *B25J 9/1676* (2013.01); *G01S 5/14* (2013.01)

(58) Field of Classification Search
CPC .................. B25J 9/1676; G01S 5/14
See application file for complete search history.

(56) References Cited

U.S. PATENT DOCUMENTS

| | | |
|---|---|---|
| 7,890,194 B2 | 2/2011 | Pannese |
| 9,424,734 B1 | 8/2016 | Hagi et al. |
| 9,792,746 B2 | 10/2017 | Brunner |
| 10,789,824 B1 | 9/2020 | Cheng et al. |

(Continued)

FOREIGN PATENT DOCUMENTS

| | | |
|---|---|---|
| CA | 2894306 A1 | 1/2016 |
| EP | 1479964 A2 | 11/2014 |

(Continued)

OTHER PUBLICATIONS

Extended European Search Report issued Apr. 25, 2024 in corresponding EP Application No. 23187316.7, 7 pages.

(Continued)

*Primary Examiner* — Curtis B Odom

(74) *Attorney, Agent, or Firm* — MH2 Technology Law Group LLP

(57) ABSTRACT

Techniques for controlling a process to prevent injury are presented. The techniques include obtaining a location estimation of a mobile transmitter affixed to an object, where the location estimation is relative to a location of a fixed receiver, and where the obtaining the location estimation includes sending an ultra wideband communication from the mobile transmitter to the fixed receiver and acquiring the ultra wideband communication by a phased antenna array of the fixed receiver; assessing, based on the location estimation, that the mobile transmitter is within an impermissible location; determining that the location estimation is sufficiently accurate based on a distance between the location estimation and the fixed receiver; and interrupting the process upon both assessing that the mobile transmitter is within an impermissible location and determining that the location estimation is sufficiently accurate.

20 Claims, 6 Drawing Sheets
(3 of 6 Drawing Sheet(s) Filed in Color)

(56) References Cited

U.S. PATENT DOCUMENTS

| | | |
|---|---|---|
| 10,796,555 B1 | 10/2020 | Cai et al. |
| 10,803,714 B1 | 10/2020 | Khera |
| 10,909,439 B2 | 2/2021 | Tournois et al. |
| 11,041,589 B2 | 6/2021 | Yu et al. |
| 11,173,607 B2 | 11/2021 | Lee et al. |
| 12,030,669 B2 | 7/2024 | Cai et al. |
| 2006/0176178 A1 | 8/2006 | Everest et al. |
| 2007/0021100 A1* | 1/2007 | Haave ............... H04M 11/04 |
| | | 455/404.2 |
| 2007/0205861 A1 | 9/2007 | Nair et al. |
| 2008/0018472 A1 | 1/2008 | Dasilva et al. |
| 2008/0256131 A1 | 10/2008 | Shimohara |
| 2009/0072631 A1 | 3/2009 | Iida et al. |
| 2013/0015971 A1 | 1/2013 | Caporizzo |
| 2014/0130645 A1 | 5/2014 | Takano et al. |
| 2014/0222521 A1 | 8/2014 | Chait |
| 2015/0161872 A1 | 6/2015 | Beaulieu et al. |
| 2016/0202692 A1 | 7/2016 | Patel et al. |
| 2016/0270574 A1 | 9/2016 | Dekar |
| 2016/0274586 A1 | 9/2016 | Stubbs et al. |
| 2017/0148116 A1 | 5/2017 | Grossman et al. |
| 2017/0151577 A1 | 6/2017 | Baltz et al. |
| 2017/0151668 A1 | 6/2017 | Boesen |
| 2017/0255193 A1 | 9/2017 | Berg et al. |
| 2017/0369288 A1 | 12/2017 | Fulton et al. |
| 2018/0033279 A1 | 2/2018 | Chong et al. |
| 2018/0232593 A1 | 8/2018 | Tani et al. |
| 2019/0026930 A1 | 1/2019 | Kritzler et al. |
| 2019/0249538 A1 | 8/2019 | Menard et al. |
| 2020/0106877 A1 | 4/2020 | Ledvina et al. |
| 2020/0312112 A1 | 10/2020 | Cheng et al. |
| 2021/0382133 A1 | 12/2021 | Seman, Jr. et al. |
| 2022/0016782 A1 | 1/2022 | Carey et al. |
| 2022/0053100 A1 | 2/2022 | Su |
| 2022/0157141 A1 | 5/2022 | Hasan et al. |

FOREIGN PATENT DOCUMENTS

| | | |
|---|---|---|
| EP | 3354412 A1 | 8/2018 |
| JP | 2016198839 A | 12/2016 |

OTHER PUBLICATIONS

Human-Robot shared-workspace Collaboration accessed in on Shared November Workspace; 24, 2020. https://www.csail.mit.edu/research/human-robot-collaboration-shared workspace accessed on Nov. 24, 2020.

Hoyt H286 SVD Personal Safety Voltage Proximity Detector; www.instrumentation2000.com; Mar. 28, 2019.

Intertial measurement unit; Wikipedia; https://en.wikipedia.org/wiki/Inertial_measurement_unit; 6 pages, accessed on Oct. 23, 2020.

Ultra-wideband; Wikipedia; https://en.wikipedia.org/wiki/Ultra-wideband; 10 pages, accessed on Oct. 23, 2020.

Prokopiou, P., European Search Report; Application EP20163021.7; dated Aug. 7, 2020, 10 pages.

Prokopiou, P., European Search Report; Application EP20163027.4; dated Aug. 13, 2020, 8 pages.

Gil et al., "A Cooperative Robotic System Based on Multiple Sensors to Construct Metallic Structures," Int J Adv Manuf Technol, Mar. 18, 2009, pp. 616-630.

Prokopiou, P., European Search Report; Application EP20163025.8; dated Aug. 12, 2020, 11 pages.

Laoudias et al., "A Survey of Enabling Technologies for Network Localization, Tracking, and Navigation," IEEE Communications Surveys & Tutorials, vol. 20, No. 4, Fourth Quarter 2018, pp. 3607-3644.

Ultra-wideband; Wikipedia; 7 pages, accessed on Aug. 26, 2019.

Human-Robot Collaboration in Shared Workspace; http://people.csail.mit.edu.

Inertial measurement unit; Wikipedia; Aug. 26, 2019, 6 pages.

* cited by examiner

ULTRA WIDEBAND LOCATION DETERMINATION WITH PREDICATIVE AND POWER SAVING CAPABILITIES

FIELD

This disclosure relates generally to location determination systems and methods.

BACKGROUND

Industrial settings, such as manufacturing floors, present many hazards to individuals, such as unintended contact with automated machinery such as robots. Various techniques exist to reduce risk to individuals in such settings, such as lock-out tag-out systems, which physically secure potentially dangerous machinery using physical locks. However, lock-out tag-out systems are only useful if the machinery is not in use.

Location systems of various size and scope exist, but their accuracy varies, and indoor locations present unique challenges, e.g., because differential GPS is not viable indoors. Various real time location systems exist to track location indoors, but are often limited by speed, accuracy, and requirements to connect with an external server to calculate location. For example, Ultra Wideband (UWB) and Bluetooth Low Energy (BLE) real time location systems exist, but vary in accuracy and require a certain amount of time to settle on a location for a fixed position.

Specific applications, such as tool automation, would benefit from accurate real time location determination techniques to prevent possible work place injuries or fatalities.

SUMMARY

According to various embodiments, a method of controlling a process to prevent injury is presented. The method includes: obtaining a location estimation of a mobile transmitter affixed to an object, where the location estimation is relative to a location of a fixed receiver, and where the obtaining the location estimation includes sending an ultra wideband communication from the mobile transmitter to the fixed receiver and acquiring the ultra wideband communication by a phased antenna array of the fixed receiver; assessing, based on the location estimation, that the mobile transmitter is within an impermissible location; determining that the location estimation is sufficiently accurate based on a distance between the location estimation and the fixed receiver; and interrupting the process upon both the assessing that the mobile transmitter is within an impermissible location and the determining that the location estimation is sufficiently accurate.

Various optional features of the above embodiments include the following. The method may include: calculating, based on the location estimation, a projected future location of the mobile transmitter; assessing, based on the projected future of the mobile transmitter, that the mobile transmitter will be within the impermissible location; and stopping operation of the tool upon both the assessing that the mobile transmitter will be within the impermissible location and the determining that the location estimation is sufficiently accurate. The method may include: determining whether the mobile transmitter is in motion, where the obtaining the location estimation occurs periodically at a first rate when the mobile transmitter is stationary and occurs periodically at a second rate when the mobile transmitter is in motion, where the second rate is greater than the first rate. The method may include determining whether the mobile transmitter is performing a repetitive motion, where the obtaining the location estimation occurs periodically at a third rate when the mobile transmitter is performing a repetitive motion, where the third rate is greater than the first rate, and where the third rate is less than the second rate. The process may include a manufacturing process performed by a robot, and the interrupting may include stopping a motion of the robot. The determining that the location estimation is sufficiently accurate may include determining that the distance between the location estimation and the fixed receiver is below a predetermined threshold. The method may include receiving from a user an identification of a permissible area, where the impermissible location includes a location outside of the permissible area. The object may include a human worker. The obtaining the location estimation may include obtaining the location estimation without communicating with a server that is external to the mobile transmitter and to the fixed receiver. The mobile transmitter may include a mobile transceiver, where the fixed receiver includes a fixed transceiver, and where the obtaining the location estimation includes sending data between the mobile transceiver and the fixed transceiver.

According to various embodiments, a system is presented. The system includes a mobile transmitted configured to be affixed to an object; and a fixed receiver including a phased antenna array; where the fixed receiver is configured to control a process to prevent injury by performing actions including: obtaining a location estimation of the mobile transmitter, where the location estimation is relative to a location of the fixed receiver, and where the obtaining the location estimation includes sending an ultra wideband communication from the mobile transmitter to the fixed receiver and acquiring the ultra wideband communication by the phased antenna array of the fixed receiver; assessing, based on the location estimation, that the mobile transmitter is within an impermissible location; determining that the location estimation is sufficiently accurate based on a distance between the location estimation and the fixed receiver; and interrupting the process upon both the assessing that the mobile transmitter is within an impermissible location and the determining that the location estimation is sufficiently accurate.

Various optional features of the above embodiments include the following. The actions may further include: calculating, based on the location estimation, a projected future location of the mobile transmitter; assessing, based on the projected future of the mobile transmitter, that the mobile transmitter will be within the impermissible location; and stopping operation of the tool upon both the assessing that the mobile transmitter will be within the impermissible location and the determining that the location estimation is sufficiently accurate. The actions may further include: determining whether the mobile transmitter is in motion, where the obtaining the location estimation occurs periodically at a first rate when the mobile transmitter is stationary and occurs periodically at a second rate when the mobile transmitter is in motion, where the second rate is greater than the first rate. The actions may further include determining whether the mobile transmitter is performing a repetitive motion, where the obtaining the location estimation occurs periodically at a third rate when the mobile transmitter is performing a repetitive motion, where the third rate is greater than the first rate, and where the third rate is less than the second rate. The process may include a manufacturing process performed by a robot, and the interrupting may include stopping a motion of the robot. The determining that the location estimation is sufficiently accurate may include determining that the distance between the location estimation and the fixed receiver is below a predetermined threshold. The actions may further include receiving from a user an identification of a permissible area, where the impermissible location includes a location outside of the permissible area. The object may include a human worker. The obtaining the location estimation may include obtaining the location estimation without communicating with a server that is external to the mobile transmitter and to the fixed receiver. The mobile transmitter may include a mobile transceiver, where the fixed receiver includes a fixed transceiver, and where the obtaining the location estimation includes sending data between the mobile transceiver and the fixed transceiver.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features of the embodiments can be more fully appreciated, as the same become better understood with reference to the following detailed description of the embodiments when considered in connection with the accompanying figures, in which.

DESCRIPTION OF THE EMBODIMENTS

Figure 1A:
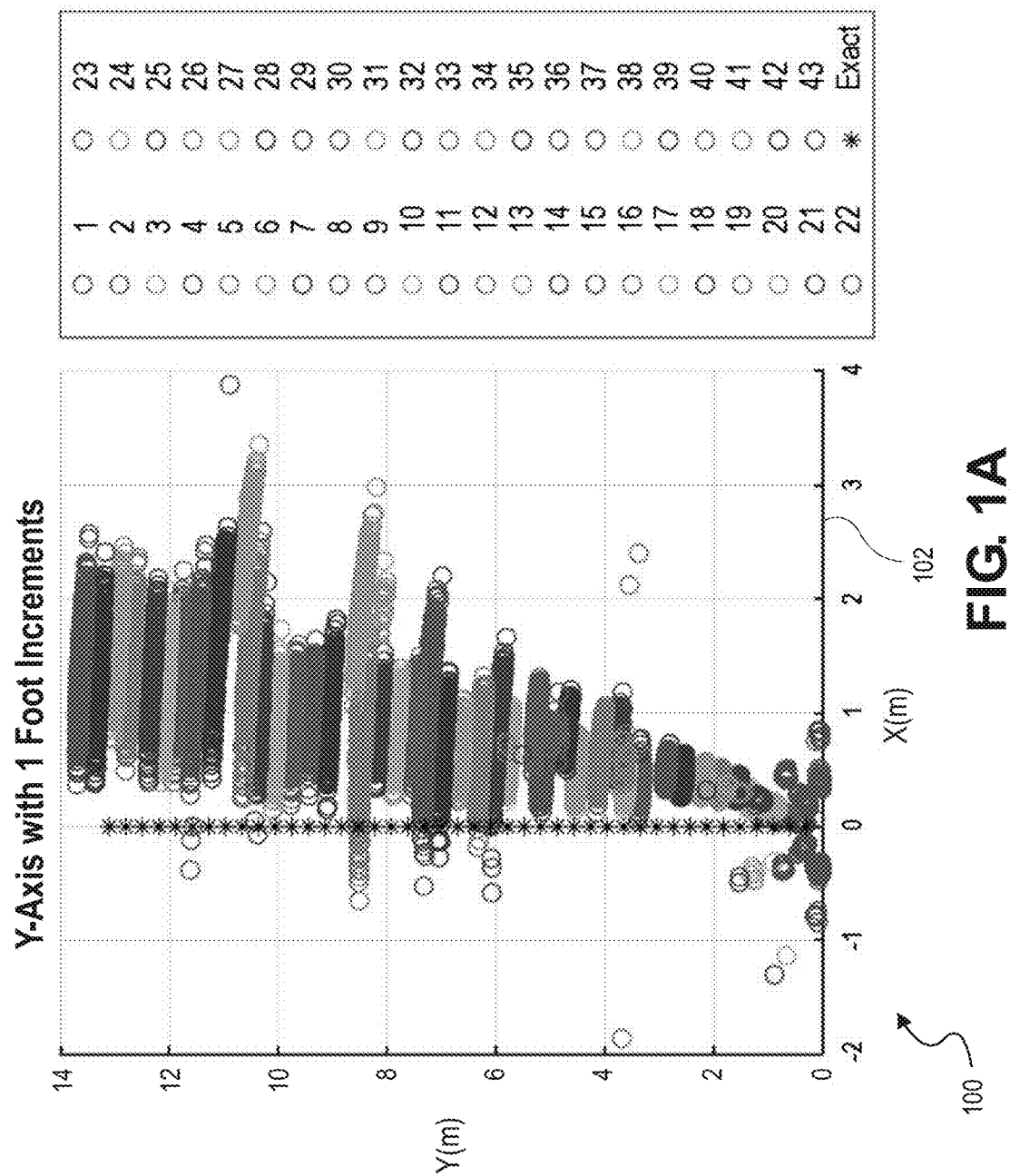
FIGS. 1A, 1B, and 1C depict three charts that illustrate accuracy limitations of existing ultra wideband real time location systems that use a simple anchor and tag.

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments include a real time location system for stopping operation of an automated tool when a person is in close proximity. In general, if a person enters an automated tool's path or is too close to the tool, the tool should automatically shut down, but if the location system is off by as little as eighteen inches, such a situation leads to a workplace injury or fatality. Existing systems often fail to provide sufficient accuracy without significant infrastructure, e.g., in the form of additional locators and tags. Accordingly, some embodiments solve the problem of accurate real time location estimation for the purpose of interrupting automated processes to prevent worker injury.

Some embodiments provide an ultra wideband real time location system that utilizes a phased array of antennas to provide superior accuracy estimations of location based on communications between the anchor and tag for purposes of ceasing potentially dangerous processes. Some embodiments include an algorithm that analyzes an automated machine tool path and compares the movement of workers to tool path movement to determine intersections and shut the tool down accordingly. Some embodiments utilize an algorithm to predict movement of various tags, e.g., used by employees, and turn off a tool in operation if there is a projected interaction, such as they are predicted to occupy the same space.

Example advantages afforded by some embodiments include the following. As a first example, some embodiments utilize a location estimation accuracy determination in order to gauge the accuracy of an ultra wideband real time location system. Because simple, e.g., single anchor and single tag, ultra wideband location systems suffer from inaccurate location determinations in some circumstances, such embodiments provide an improved technique for estimating a location of a tag and interrupting a potentially dangerous process if warranted. As a second example, some embodiments conserve battery life in a tag by switching between two or more sensing and acting states. For example, some embodiments include both a static algorithm state, for when the tag is not in motion and a dynamic algorithm state for when the tag is in motion. Such embodiments may use relative infrequent communication between anchor and tag when in the static state, and more frequent communication when in the dynamic state. As a third example, some embodiments provide extremely fast detection of tags in or potentially in impermissible areas such as in proximity to automated machinery. Such embodiments can achieve such fast detection because they do not require communication with any server to determine tag location. Instead, the location of the tag is estimated based solely on communications between the tag and anchor. These and other features and advantages are shown and described in detail in reference to the figures as follows.

In general, ultra wideband real time location systems include a receiver, which may also transmit and therefore be a transceiver, at a fixed location, sometimes referred to as an "anchor," and a mobile transmitter, which may also receive and therefore be a transceiver, sometimes referred to as a "tag." Example such systems may be based on, for example, the IEEE 802.15.4a standard. In general, the anchor is typically, but not necessarily, powered using hardwired outlet current, and the tag is typically battery powered. The ultra wideband real time location systems determine the location of the tag relative to the anchor based on one or more radio frequency ultra wideband communications between the tag and anchor. For example, the anchor may include a phased antenna array (including two or more antenna elements), which is used to triangulate the location of the tag based on the phase of signals transmitted from the tag and received by the anchor. Various configurations may be used, e.g., where the communications are one-way or where the messages are two-way between the tag and anchor. However, existing ultra wideband real time location systems suffer from a lack of accuracy, e.g., as a function of distance between the tag and receiver and/or as a function of offset of the tag relative to a straight line in a direction of the phased antenna array of the anchor.

Figure 1B:
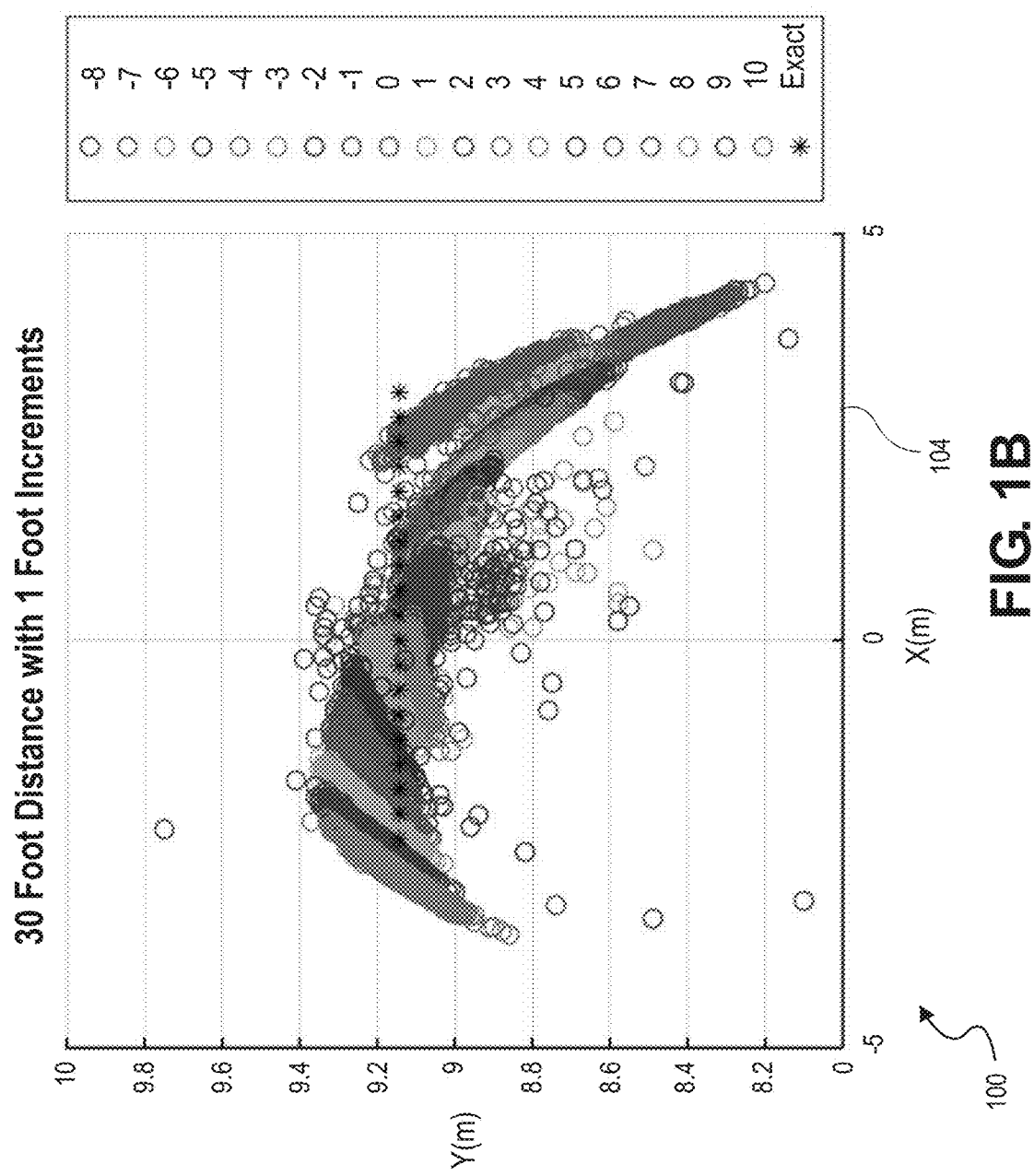
Figure 1C:
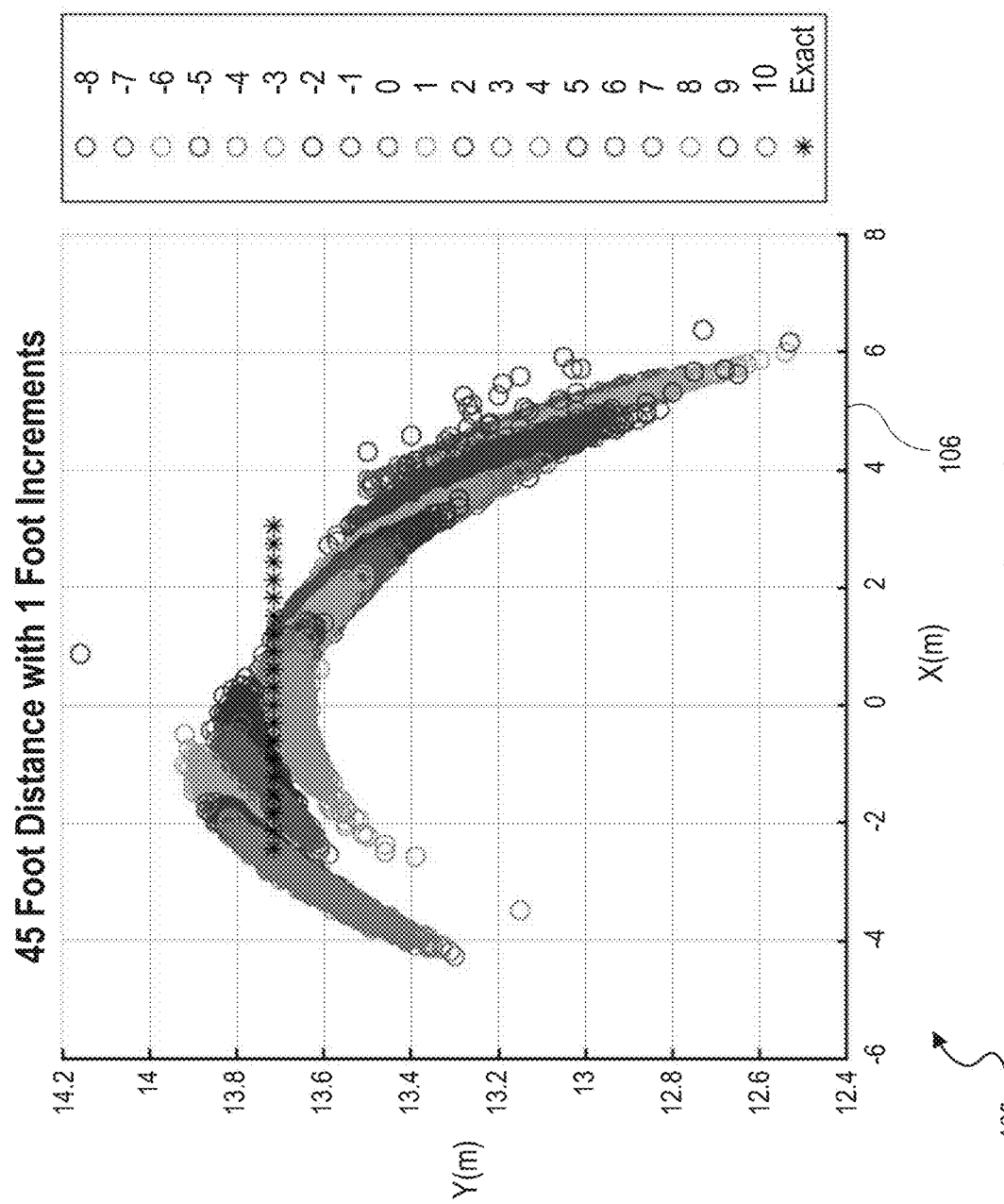

FIGS. 1A, 1B, and 1C depict three charts 100 that illustrate accuracy limitations of existing ultra wideband real time location systems that use a simple anchor and tag. Chart 102 depicts estimated tag locations (circles) provided by an ultra wideband real time location system for various actual tag locations (stars) as the distance between the tag and anchor vary. As seen in chart 102, as the distance increases, the accuracy decreases. When the distance is within about five feet, the location estimation may be sufficiently accurate for use with some embodiments.

Chart 104 depicts estimated tag locations (circles) provided by an ultra wideband real time location system for various actual tag locations (stars) as the location of the tag varies laterally with respect to the anchor at a distance of 30 feet away from the anchor. As is apparent from chart 104, as the lateral distance of the tag increases relative to the center line of the phased antenna array of the anchor, the estimated location becomes more inaccurate.

Chart 106 depicts estimated tag locations (circles) provided by an ultra wideband real time location system for various actual tag locations (stars) as the location of the tag varies laterally with respect to the anchor at a distance of 45 feet away from the anchor. As illustrated by chart 104, as the lateral distance of the tag increases relative to the center line of the phased antenna array of the anchor, the estimated location becomes more inaccurate. In comparison to the inaccuracies depicted in chart 104, where the centerline distance between the anchor and tag is 30 feet, in chart 106, where the centerline distance between the anchor and tag is 45 feet, the location estimations are less accurate.

Some embodiments conserve battery life in the tag by reducing the frequency of location estimation communications between the anchor and the tag when the tag is determined to be static, that is, motionless, and increasing the frequency of such location estimation communications as the speed of the tag relative to the anchor increases. According to some embodiments, periodicity of the location determination communications between the anchor and tag, as well as associated processing such as to determine whether to, and to actually interrupt, a tool process, varies according to the speed of the tag relative to the anchor. Thus, some embodiments may utilize a static state algorithm, a dynamic state algorithm, and one or more hybrid state algorithms, which may be intermediate between the static and dynamic state algorithms, depending on the speed of the tag. By reducing communications between the tag and anchor as the speed of the tag relative to the anchor decreases (or ceases), some embodiments reduce battery consumption by the tag, thus extending battery life and therefore the usable timeframe of the system.

Figure 2:
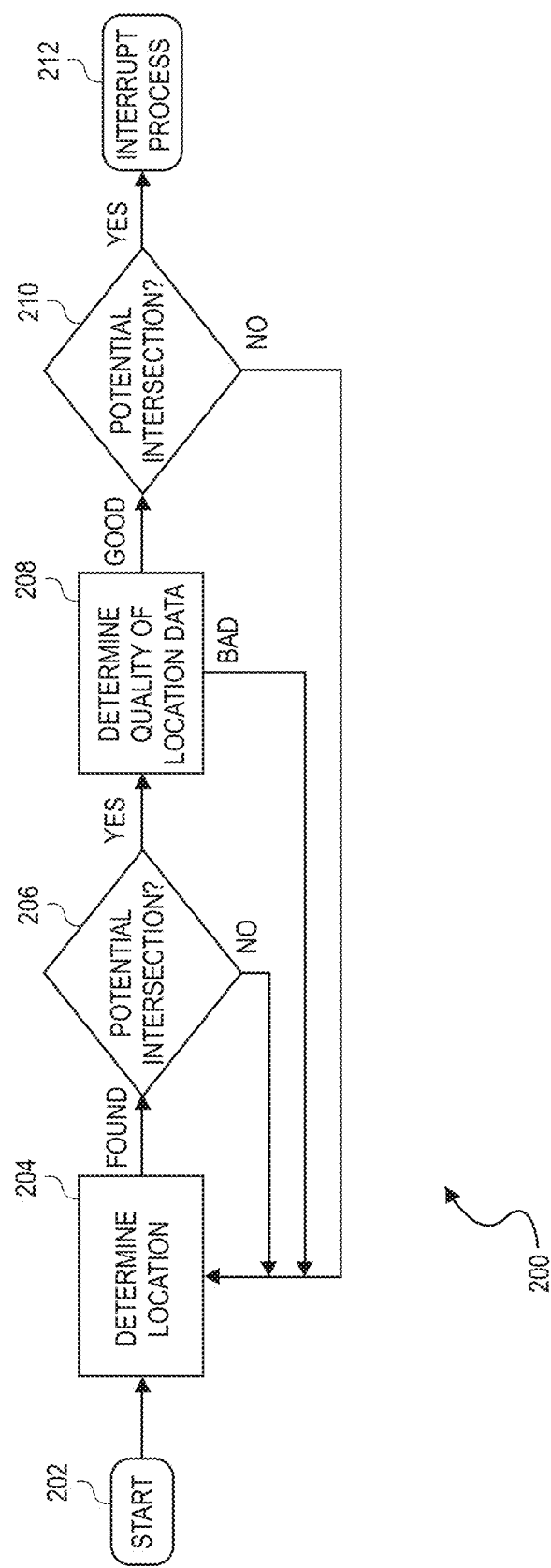
FIG. 2 is a flow chart for a static state algorithm of a real time location system according to various embodiments.

FIG. 2 is a flow chart 200 for a static state algorithm of a real time location system according to various embodiments. The algorithm may be implemented by a controller that includes an electronic processor that is in communication with, e.g., included in, an anchor.

Figure 4:
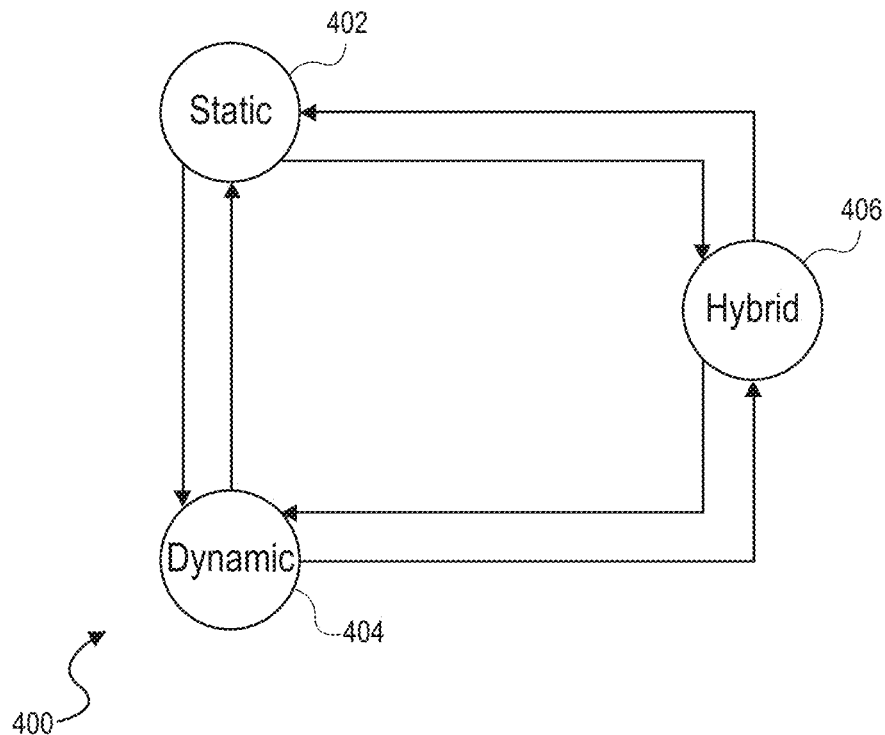
FIG. 4 is a flow chart for a state transition algorithm of a real time location system according to various embodiments.

At 202, the static state algorithm may start, e.g., as a default starting state, according to a determination that the tag is motionless relative to the anchor, or as otherwise described herein, e.g., in reference to FIG. 4.

At 204, the static state algorithm estimates the location of the tag, e.g., using one or more ultra wideband communication between the anchor and tag. For the static state algorithm, the cadence of the estimations according to this block may be, by way of non-limiting example, 1 Hz or below, which may be relatively slow in comparison to the cadence of the corresponding estimations of the dynamic or hybrid state algorithms.

At 206, the static state algorithm determines whether there is a potential intersection of the tag with an impermissible location. In general, the impermissible location may include a predetermined (e.g., pre-specified) location proximate to a tool, such as an automated manufacturing tool, e.g., a robot or robotic arm. Such proximity may be predetermined and specified in terms of feet, e.g., within 1 ft, 1.5 ft, 2 ft, 2.5 ft, 3 ft, 3.5 ft, 4 ft, 4.5 ft, 5 ft, etc. According to some embodiments, additional, or alternate impermissible locations may be specified by a user, e.g., as indicated on a graphical user interface that displays a floorplan or map of the area of operation. For example, a user may specify, e.g., by highlighting using a drawing tool in a graphical user interface, a permissible location, outside of which is impermissible. Such a permissible location may include a walkway for humans, for example. Such a user interface may be used to specify an impermissible location proximate to a tool in addition or in the alternative. According to various embodiments, at 206, the static algorithm determines whether the estimated location of the tag lies within the predetermined impermissible location by comparing the estimated location to the predetermined impermissible location. If an overlap or intersection is found, then control passes to 208. Otherwise, control reverts to 204.

At 208, the static state algorithm determines the quality of the location estimation. According to some embodiments, the quality is determined as a function of the distance and/or location of the tag relative to the anchor. According to some embodiments, the quality is deemed sufficient if the tag is within a specified distance of the anchor, e.g., within 1 ft, 2 ft, 3 ft, 4 ft, 5 ft, 6 ft, 7 ft, 8 ft, 9 ft, 10 ft, 11 ft, or 12 ft, otherwise the quality is deemed insufficient. According to some embodiments, the quality is deemed sufficient if the within an equilateral triangle with apex at the anchor and extending along the centerline of the phased antenna array of the anchor. The dimensions of the equilateral triangle may be determined such that if the tag is present at any location within its boundaries, then the location estimation is within a given accuracy, e.g., ±1 ft, 1.5 ft, 2 ft, 2.5 ft, 3 ft, 3.5 ft, 4 ft, 4.5 ft, 5 ft, etc. Such dimensions may be determined from previously produced accuracy assessment charts such as are shown and described herein in reference to FIGS. 1A, 1B, and/or 1C. For example, a specified impermissible proximity to a tool may be specified in terms of a length, and a triangle within which the impermissible proximity length is accurate to within a specified accuracy may be determined. If the quality of the location estimation is determined to be sufficient, then control passes to 210. Otherwise, control reverts to 204.

At 210, the static state algorithm determines whether there is a potential intersection of the tag with an impermissible location. The actions of 210 may be essentially the same as the actions of 206.

At 212, the static state algorithm proceeds to interrupt a process, e.g., in order to prevent injury and/or collision. The interruption may include action such as, by way of non-limiting example, shutting down, idling, or ceasing motion of a machine, such as a tool or portion thereof, a robot or portion thereof, or a conveyor or portion thereof. The interruption may be achieved by sending a signal from the anchor to the machine by direct wireline or by wireless communication.

Figure 3:
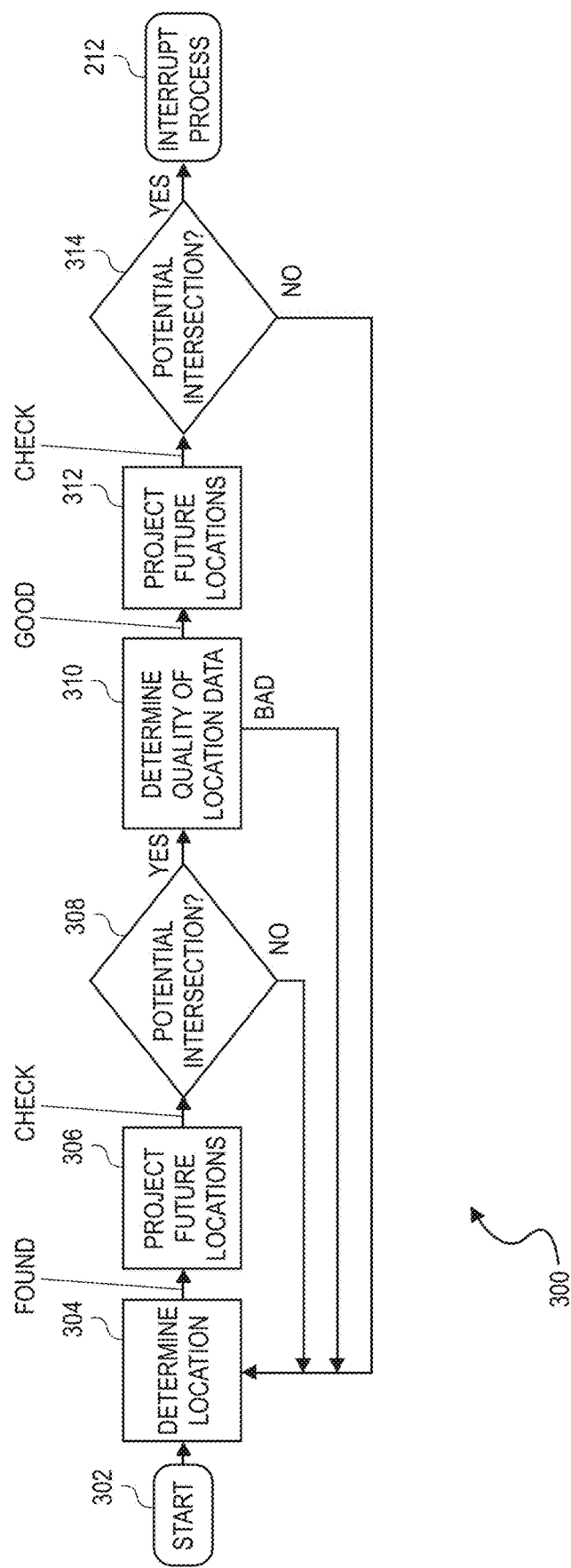
FIG. 3 is a flow chart for a dynamic state algorithm of a real time location system according to various embodiments.

FIG. 3 is a flow chart 300 for a dynamic state algorithm of a real time location system according to various embodiments. The algorithm may be implemented by a controller that includes an electronic processor that is in communication with, e.g., included in, an anchor.

At 302, the dynamic state algorithm may start, e.g., as a default starting state, according to a determination that the tag is in motion (e.g., above a prespecified speed) relative to the anchor, or as otherwise described herein, e.g., in reference to FIG. 4.

At 304, the dynamic state algorithm estimates the location of the tag, e.g., using one or more ultra wideband communication between the anchor and tag. For the dynamic state algorithm, the cadence of the estimations according to this block may be, by way of non-limiting example, 1 Hz or above, e.g., between 1 Hz and 5 Hz, which may be relatively fast in comparison to the cadence of the corresponding estimations of the static or hybrid state algorithms.

At 306, the dynamic state algorithm projects a future location of the tag. The projection may be for a point in time a number of seconds ahead, e.g., 1 sec, 2 sec, 3 sec, 4 sec, 5 sec, 15 sec, 20 sec, or more. The projection may be accomplished by comparing, e.g., subtracting, the previous location estimation with the current location estimation and deriving a vector from the comparison. The vector may be extrapolated to the projected future location according to the amount of time ahead, e.g., by multiplying the derived vector by a temporal scaling factor such that it represents the projected future location at the specified future time.

At 308, the dynamic state algorithm determines whether there will be a potential intersection of the tag with an impermissible location. In general, the impermissible location may include any of the locations as described herein in reference to block 206 of FIG. 2. That is, according to some embodiments, the impermissible locations utilized by the dynamic state algorithm may be the same as the impermissible locations utilized by the static state algorithm. According to various embodiments, at 306, the dynamic algorithm determines whether the projected location of the tag lies within the predetermined impermissible location by comparing the projected location to the predetermined impermissible location. If an overlap or intersection is found, then control passes to 310. Otherwise, control reverts to 304.

At 310, the dynamic state algorithm determines the quality of the location estimation. According to some embodiments, the quality is determined as a function of the distance and/or location of the tag relative to the anchor. The actions of this block may be performed as described herein in reference to block 208 of FIG. 2. If the quality of the location estimation is determined to be sufficient, then control passes to 312. Otherwise, control reverts to 304.

At 312, the dynamic state algorithm projects a future location of the tag. According to some embodiments, the actions of this block may be performed as described herein in reference to block 306. According to some embodiments, the projected future location of block 306 may be used for the projected future location of this block. Thus, according to some embodiments, the actions of this block may be omitted.

At 314, the dynamic state algorithm determines whether there is a potential intersection of the tag with an impermissible location. The actions of this block may be essentially the same as the actions of block 308. According to some embodiments, the actions of this block utilize the projected future location of the tag determined at block 312.

At 316, the dynamic state algorithm proceeds to interrupt a process, e.g., in order to prevent injury and/or collision. The actions of this block may be as described herein in reference to block 212 of FIG. 2.

Some embodiments may include one or more hybrid states in addition to a static state and a dynamic state. The hybrid state(s) may be executed as shown and described herein in reference to the dynamic state of FIG. 3, except that the cadence(s) may be intermediate to those of the static state and the dynamic state. By way of non-limiting example, an embodiment may have a static state with a cadence of 0.5 Hz, a dynamic state with a cadence of 5 Hz, and a hybrid state with a cadence of 2 Hz. In general, an embodiment may have a static state with a cadence in the range of 0 to 1 Hz, a dynamic state with a cadence greater than 1 Hz, and one or more hybrid states with cadence(s) between those of the static and dynamic states.

A hybrid state may be implemented when the tag is moving, but not moving as much as for implementing the dynamic state. Thus, a hybrid state may correspond to tag velocity intermediate between the velocity associated with the dynamic state and the motionless velocity associated with the static state. A particular instance of a hybrid state implementation may occur when repetitive motion of the tag is detected. Examples of such repetitive motion may occur, by way of non-limiting examples, when a worker to which the tag is attached is pacing or performing an assembly process that requires repeated transitions between station locations.

Embodiments may transition between states based on any, or a combination, of: the current velocity of the tag, the current acceleration of the tag, and/or the quality of the location estimation for the tag. Note that the current velocity of the tag may range from zero velocity (i.e., the tag is motionless) to any positive velocity. Note that the current acceleration of the tag may range from negative acceleration (i.e., the velocity of the tag is projected to decrease, possibly to a stop), no acceleration (i.e., the velocity of the tag is projected to be unchanged), or positive acceleration (i.e., the velocity of the tag is projected to increase, possibly from motionless to in motion). Embodiments may determine current velocity as represented by the vectors determined at any of blocks 306 and/or 312. Embodiments may determine current acceleration by comparing, e.g., subtracting, successively determined velocities and/or velocity representative vectors.

FIG. 4 is a flow chart 400 for a state transition algorithm of a real time location system according to various embodiments. The algorithm may be implemented by a controller that includes an electronic processor that is in communication with, e.g., included in, an anchor. One state may be active at a time, but embodiments may transition between states as described in non-limiting examples presently. According to some embodiments, the state transition algorithm may execute concurrently with, e.g., parallel to, the state algorithm for the currently active state.

Various embodiments may transition from a static state 402 to a hybrid state 406 when any, or any combination, of the following occur: the velocity is non-zero and the acceleration indicates that the velocity is decreasing, a repetitive motion is detected, and/or the location estimation quality is at least moderate.

Various embodiments may transition from a hybrid state 406 to a static state 402 when any, or any combination, of the following occur: the velocity is zero or close to zero and the acceleration indicates that the velocity is decreasing, and/or the location estimation quality is at least moderate.

Various embodiments may transition from a static state 402 to a dynamic state 404 when any, or any combination, of the following occur: the velocity is non-zero and the acceleration indicates that the velocity will continue to be non-zero, and/or the location estimation quality is high.

Various embodiments may transition from a dynamic state 404 to a static state 402 when any, or any combination, of the following occur: the velocity is zero and the acceleration indicates that the velocity will continue to be zero, and/or the location estimation quality is high.

Various embodiments may transition from a dynamic state 404 to a hybrid state 406 when any, or any combination, of the following occur: the velocity is zero or close to zero and the acceleration indicates that the velocity is constant or increasing, a repetitive motion is detected, and/or the location estimation quality is at least moderate.

Various embodiments may transition from a hybrid state 406 to a dynamic state 404 when any, or any combination, of the following occur: the velocity is non-zero and the acceleration indicates that the velocity is constant or increasing, and/or the location estimation quality is high.

Figure 5:
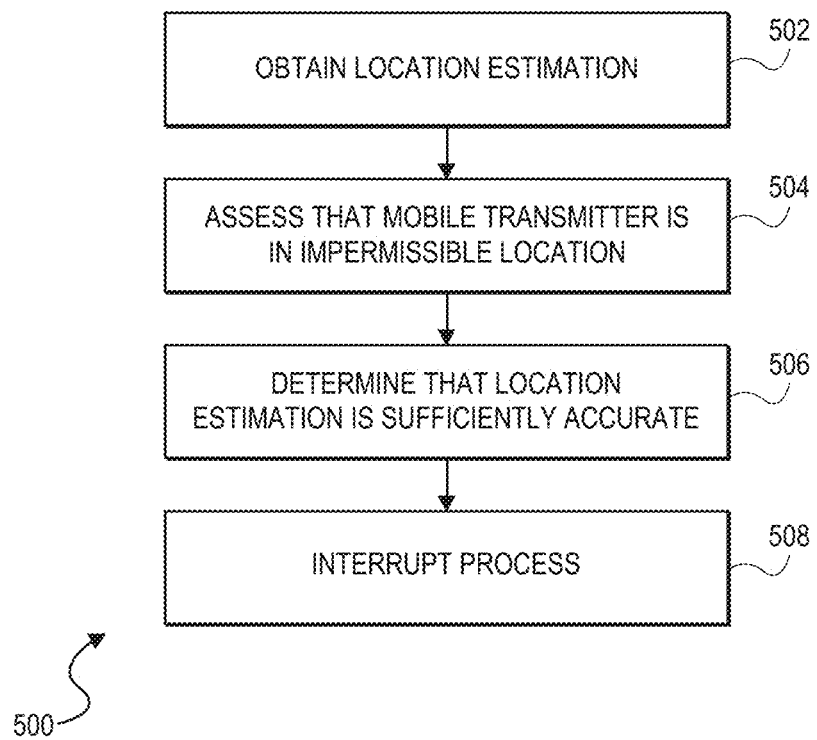
FIG. 5 is a flow chart for a real time location method according to various embodiments.

FIG. 5 is a flow chart 500 for a real time location method according to various embodiments. The method may be implemented using a tag and anchor together with a processor that is communicatively coupled to the anchor and to a process controller.

At 502, the method includes obtaining a location estimation of a mobile transmitter, such as a tag, affixed to an object, where the location estimation is relative to a location of a fixed receiver, such as an anchor. The location estimation may be obtained by a process as described herein in reference to FIGS. 1A, 1B, and 1C, for example, that includes sending an ultra wideband communication from the mobile transmitter to the fixed receiver and acquiring the ultra wideband communication by a phased antenna array of the fixed receiver.

At 504, the method includes assessing, based on the location estimation, that the mobile transmitter is within an impermissible location. The actions of this block may be performed as described herein in reference to FIGS. 2 and 3, for example.

At 506, the method includes determining that the location estimation is sufficiently accurate based on a distance between the location estimation and the fixed receiver. The actions of this block may be performed as described herein in reference to FIGS. 2 and 3, for example.

At 508, the method includes interrupting a process upon both assessing that the mobile transmitter is within an impermissible location and determining that the location estimation is sufficiently accurate. The actions of this block may be performed as described herein in reference to FIGS. 2 and 3, for example.

Many variations and modifications of the disclosed techniques are possible. For example, although disclosed in the context of factory workers and automated machinery, embodiments are not so limited. Some embodiments may be used to track workers that are loading cargo into a transport such as a truck or ship. In general, tags may be affixed to a worker on the worker's badge, hardhat, or armband, for example, but tags are not limited to being affixed to humans. Some embodiments may be used to track the location of a mobile robot such as an automated guided vehicle (AGV), for example, and may interrupt a process of the robot to which it is attached or a different process if the robot enters or is projected to enter an impermissible location. The tag may be affixed to the robot using adhesive, bolts, rivets, or any other suitable attachment mechanism. Further, embodiments may include any number of tags and any number of anchors. Multiple anchors are particularly beneficial when a general area includes regions that are electromagnetically isolated, such as within an aircraft fuselage. In such a case, one or more anchors may be present within the electromagnetically isolated region (e.g., fuselage) and one or more anchors may be present outside of the electromagnetically isolated region. If any anchor detects an actual or potential entry into an impermissible location, the relevant process may be interrupted.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of controlling a process to prevent injury, the method comprising:
    obtaining a location estimation of a mobile transmitter affixed to an object, wherein the location estimation is relative to a location of a fixed receiver, and wherein the obtaining the location estimation comprises sending an ultra wideband communication from the mobile transmitter to the fixed receiver and acquiring the ultra wideband communication by a phased antenna array of the fixed receiver;
    assessing, based on the location estimation, that the mobile transmitter is within an impermissible location;
    determining that the location estimation is sufficiently accurate based on a distance between the location estimation and the fixed receiver; and
    interrupting the process upon both the assessing that the mobile transmitter is within an impermissible location and the determining that the location estimation is sufficiently accurate.

2. The method of claim 1, further comprising:
    calculating, based on the location estimation, a projected future location of the mobile transmitter;
    assessing, based on the projected future of the mobile transmitter, that the mobile transmitter will be within the impermissible location; and
    stopping operation of the process upon both the assessing that the mobile transmitter will be within the impermissible location and the determining that the location estimation is sufficiently accurate.

3. The method of claim 1, the method further comprising:
    determining whether the mobile transmitter is in motion, wherein the obtaining the location estimation occurs periodically at a first rate when the mobile transmitter is stationary and occurs periodically at a second rate when the mobile transmitter is in motion, wherein the second rate is greater than the first rate.

4. The method of claim 3,
further comprising determining whether the mobile transmitter is performing a repetitive motion,
wherein the obtaining the location estimation occurs periodically at a third rate when the mobile transmitter is performing a repetitive motion, wherein the third rate is greater than the first rate, and wherein the third rate is less than the second rate.

5. The method of claim 1,
wherein the process comprises a manufacturing process performed by a robot, and
wherein the interrupting comprises stopping a motion of the robot.

6. The method of claim 1, wherein the determining that the location estimation is sufficiently accurate comprises determining that the distance between the location estimation and the fixed receiver is below a predetermined threshold.

7. The method of claim 1, further comprising receiving from a user an identification of a permissible area, wherein the impermissible location comprises a location outside of the permissible area.

8. The method of claim 1, wherein the object comprises a human worker.

9. The method of claim 1, wherein the obtaining the location estimation comprises obtaining the location estimation without communicating with a server that is external to the mobile transmitter and to the fixed receiver.

10. The method of claim 1, wherein the mobile transmitter comprises a mobile transceiver, wherein the fixed receiver comprises a fixed transceiver, and wherein the obtaining the location estimation comprises sending data between the mobile transceiver and the fixed transceiver.

11. A system comprising:
a mobile transmitter configured to be affixed to an object; and
a fixed receiver comprising a phased antenna array;
wherein the fixed receiver is configured to control a process to prevent injury by performing actions comprising:
obtaining a location estimation of the mobile transmitter, wherein the location estimation is relative to a location of the fixed receiver, and wherein the obtaining the location estimation comprises sending an ultra wideband communication from the mobile transmitter to the fixed receiver and acquiring the ultra wideband communication by the phased antenna array of the fixed receiver;
assessing, based on the location estimation, that the mobile transmitter is within an impermissible location;
determining that the location estimation is sufficiently accurate based on a distance between the location estimation and the fixed receiver; and
interrupting the process upon both the assessing that the mobile transmitter is within an impermissible location and the determining that the location estimation is sufficiently accurate.

12. The system of claim 11, wherein the actions further comprise:
calculating, based on the location estimation, a projected future location of the mobile transmitter;
assessing, based on the projected future of the mobile transmitter, that the mobile transmitter will be within the impermissible location; and
stopping operation of the process upon both the assessing that the mobile transmitter will be within the impermissible location and the determining that the location estimation is sufficiently accurate.

13. The system of claim 11, wherein the actions further comprise:
determining whether the mobile transmitter is in motion,
wherein the obtaining the location estimation occurs periodically at a first rate when the mobile transmitter is stationary and occurs periodically at a second rate when the mobile transmitter is in motion, wherein the second rate is greater than the first rate.

14. The system of claim 13,
wherein the actions further comprise determining whether the mobile transmitter is performing a repetitive motion,
wherein the obtaining the location estimation occurs periodically at a third rate when the mobile transmitter is performing a repetitive motion, wherein the third rate is greater than the first rate, and wherein the third rate is less than the second rate.

15. The system of claim 11,
wherein the process comprises a manufacturing process performed by a robot, and
wherein the interrupting comprises stopping a motion of the robot.

16. The system of claim 11, wherein the determining that the location estimation is sufficiently accurate comprises determining that the distance between the location estimation and the fixed receiver is below a predetermined threshold.

17. The system of claim 11, wherein the actions further comprise receiving from a user an identification of a permissible area, wherein the impermissible location comprises a location outside of the permissible area.

18. The system of claim 11, wherein the object comprises a human worker.

19. The system of claim 11, wherein the obtaining the location estimation comprises obtaining the location estimation without communicating with a server that is external to the mobile transmitter and to the fixed receiver.

20. The system of claim 11, wherein the mobile transmitter comprises a mobile transceiver, wherein the fixed receiver comprises a fixed transceiver, and wherein the obtaining the location estimation comprises sending data between the mobile transceiver and the fixed transceiver.

* * * * *